United States Patent
Kroskey et al.

(10) Patent No.: US 8,246,772 B2
(45) Date of Patent: Aug. 21, 2012

(54) PROGRAMMABLE ROLLFORMER FOR COMBINING AN ARCHITECTURAL SHEET WITH A SOLAR PANEL AND METHOD

(75) Inventors: Dale Kroskey, Fayetteville, GA (US); Curtis Lafore, Wales, MI (US); Geoffrey Louis Stone, Peachtree City, GA (US)

(73) Assignee: Metalforming, Inc., Peachtree City, GA (US)

( * ) Notice: Subject to any disclaimer, the term of this patent is extended or adjusted under 35 U.S.C. 154(b) by 294 days.

(21) Appl. No.: 12/797,697

(22) Filed: Jun. 10, 2010

(65) Prior Publication Data

US 2010/0242243 A1  Sep. 30, 2010

Related U.S. Application Data

(63) Continuation-in-part of application No. 12/688,971, filed on Jan. 18, 2010, and a continuation-in-part of application No. 12/424,979, filed on Apr. 16, 2009, now abandoned.

(60) Provisional application No. 61/045,454, filed on Apr. 16, 2008.

(51) Int. Cl.
*B26D 5/00* (2006.01)
*B29C 65/48* (2006.01)
*B32B 37/00* (2006.01)
*B32B 38/04* (2006.01)
*B32B 41/00* (2006.01)
*B32B 43/00* (2006.01)
*G05G 5/00* (2006.01)

(52) U.S. Cl. ......... 156/249; 156/250; 156/353; 156/537

(58) Field of Classification Search .................. 156/247, 156/249, 250, 258, 269, 289, 350, 353, 355, 156/443, 446, 467, 468, 510, 513, 537
See application file for complete search history.

(56) References Cited

U.S. PATENT DOCUMENTS 4,028,794 A * 6/1977 Ritchie et al. .................. 29/882
(Continued)

FOREIGN PATENT DOCUMENTS

EP  2139050 A2 * 12/2009
(Continued)

OTHER PUBLICATIONS

English Abstract of JP 2002-97757.*
English Abstract of JP 60-95959.*
English Abstract of JP 2003-213847.*

*Primary Examiner* — Sing P Chan
(74) *Attorney, Agent, or Firm* — Thomas, Kayden, Horstemeyer & Risley, LLP

(57) ABSTRACT

A programmable machine and method for adhering a flexible photovoltaic film panel onto metal supplied from a roll for forming a combination solar and roof panel is provided. The voltaic film panels and metal to which is adhered are supplied on rolls which are fed from reels. The rollformer can form male and female edges on the metal which are necessary for a metal roof. The angle at which the exit cutter can cut is calculated by the programmable computer. A measuring device for measuring the roofing and transferring the data to the programmable machine or the placement of the solar film panels and the cutting of the panels is also provided.

19 Claims, 10 Drawing Sheets

U.S. PATENT DOCUMENTS

| | | | |
|---|---|---|---|
| 7,449,629 B2 * | 11/2008 | Ferri et al. | 136/251 |
| 7,677,071 B2 * | 3/2010 | Heirich | 72/181 |
| 2004/0216778 A1 * | 11/2004 | Ferri et al. | 136/251 |
| 2006/0005874 A1 * | 1/2006 | Ferri et al. | 136/251 |
| 2011/0185651 A1 * | 8/2011 | Taylor | 52/173.3 |
| 2011/0300664 A1 * | 12/2011 | Chung | 438/80 |
| 2011/0308567 A1 * | 12/2011 | Chung | 136/244 |

FOREIGN PATENT DOCUMENTS

| | | | |
|---|---|---|---|
| GB | 1135982 A | * | 12/1968 |
| JP | 60095959 A | * | 5/1985 |
| JP | 2002097757 A | * | 4/2002 |
| JP | 2003213847 A | * | 7/2003 |

* cited by examiner

PROGRAMMABLE ROLLFORMER FOR COMBINING AN ARCHITECTURAL SHEET WITH A SOLAR PANEL AND METHOD

CROSS-REFERENCE TO RELATED APPLICATION

This application claims priority to U.S. Provisional Application having Ser. No. 61/045,454 filed Apr. 16, 2008 and of U.S. patent application Ser. No. 12/424,979 filed on Apr. 16, 2009, and U.S. patent application Ser. No. 12/688,971 filed on Jan. 18, 2010, which are entirely incorporated hereby by reference.

FIELD OF THE INVENTION

This present invention discloses a machine and method for adhering flexible photovoltaic film panels onto metal supplied from a roll for forming a combination solar and roof panel. The photovoltaic film panels and the metal to which it is adhered are supplied on rolls which are fed from reels into a rollformer with a special attachment to produce the roofing panel with the photovoltaic film panels. This machine is programmable to cut the metal panels at a desired location and angle.

BACKGROUND OF THE INVENTION

Photovoltaic devices provide reliable sources of electrical energy. Thin film photovoltaic devices are particularly advantageous since they are relatively low in cost, flexible, and capable of being manufactured in relatively large sizes by continuous deposition processes. Such thin film devices can be encapsulated in transparent, durable, flexible polymeric bodies, and are ideally suited for building mounted installations.

These thin photovoltaic film panels can be applied to roofs by adhering the film panels directly to the roof. An adhesive can be placed on the bottom of the film panel to which a backing material is attached. The backing material can be removed and the film panel placed on the roof so that the adhesive will adhere the film to the roof. These photovoltaic film panels can be applied to the roof in areas where the roof receives sufficient sunlight.

The electricity of the photovoltaic film panels is transmitted to contact terminals which typically extend from one end of the photovoltaic area of the panel, and may be connected to a junction box or other connector device for transmitting to supply power to the building or into the electricity grid that supplies a city or an area.

The thin photovoltaic film can be placed on a roll or reel and supplied to a roof by unrolling the film and removing the backing and pressing the adhering film to the roof. This manual process is a very labor intensive procedure and sometimes resulted in the photovoltaic film not being properly adhered to the roof. Roofs are subjected to high winds and other weather conditions that may damage or remove the photovoltaic material.

A machine and method are needed for applying the photovoltaic film panels to roofs to save labor costs and to improve reliability of the adhesion of the film panels to the roof. The hand cutting of the metal panels to which the solar panels are attached is a labor intensive task.

DETAILED DESCRIPTION OF THE INVENTION

The present invention relates to a process by which a solar film panel with an adhesive on the bottom and a backing protecting the adhesive is combined with metal to produce a combination sheet of a solar panel and a metal roofing material. This combination solar film panel and metal can used for roof panels, wall panels and ground mount solar panels.

Figure 1:
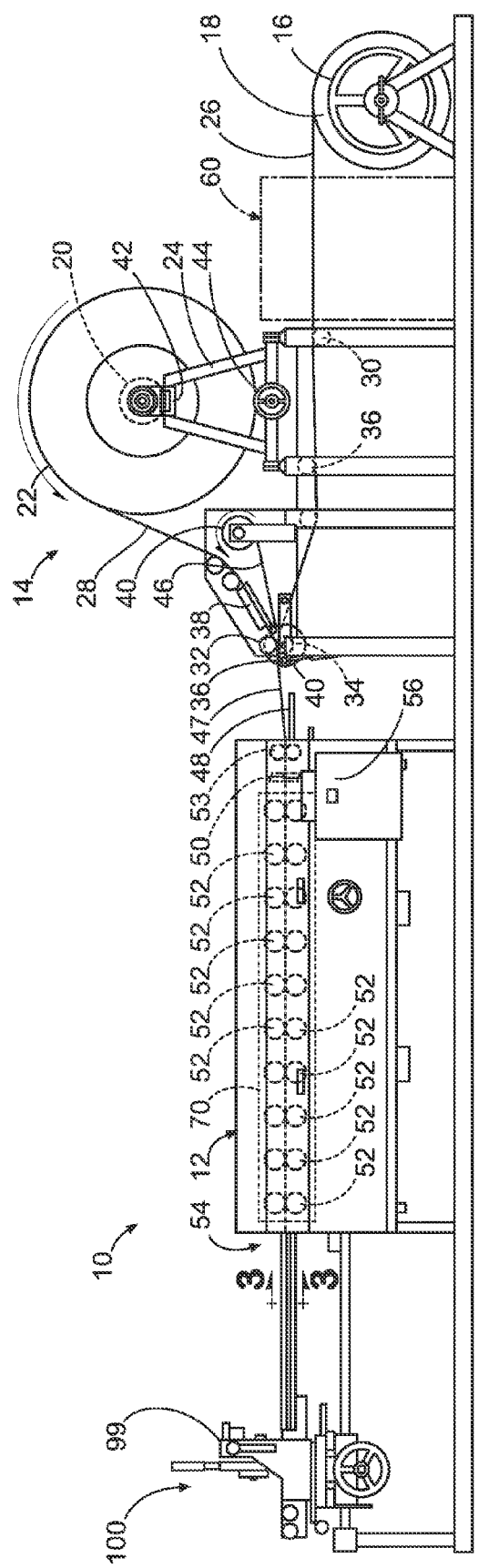
FIG. 1 is a schematic drawing of a programmable rollformer with decoiler for unwinding coils of metal and solar panels and laminating the metal and solar panels together and feeding into the rollformer for producing a structure of the desired configuration and having the capability of cutting the metal panels at the desired location and angle.
Figure 1A:
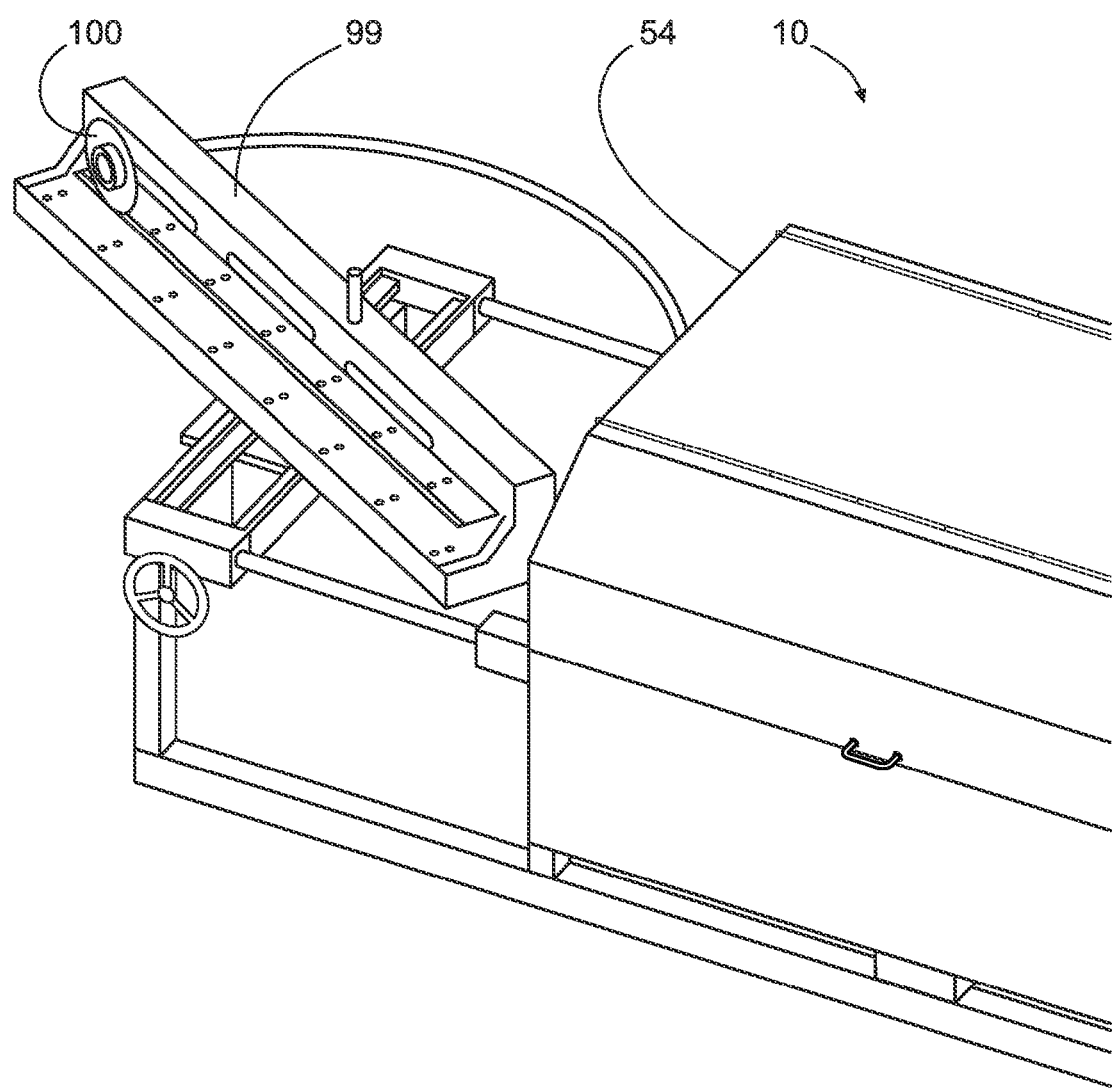
FIG. 1A is perspective view of the exit cutter attached to the rollformer.

As shown in FIG. 1 a programmable rollformer with decoiler and laminator 10 has a rollformer 12 section with a decoiler and laminator 14 section which has a decoiler 20 for the solar panels for holding a coil of solar panels 22. The decoiler and laminator 14 has frame 24, with a decoiler reel 16 for metal which holds a metal coil 18. The metal 26 is threaded past idler roller 36 and between a top pressure roller 32 and a bottom pressure roller 34. A spray system and wiper 30 may used to clean the metal 26 for processing.

A means is needed for removing the backing 46 from the solar panels. A recoiler with a motor 40 may be used to remove the backing 46 from the solar panels so that the adhesive can adhere the solar panel to the metal.

The solar panels with adhesive applied can be disconnected from the solar coil 22 by using a brake, such as a mechanical brake 42, attached to the solar decoiler 20 holding the solar coil 22. This brake 42 will apply tension at the proper time to allow the previously perforated adhesive backing 46 to part or break free from the adhesive. The length of the solar panel may be less than that of the metal sheet to which it is applied. An alternate method may use a cutting shear wheel, motorized or manually actuated to cut the adhesive free from the coil. The shear wheel may be a single unit cutting against a stationary mating blade surface, or a pair of traversing wheels.

The metal and solar films are pressed together by pressure rolls 32, 34 so the adhesive binds them together. Then the metal and solar film are run through a rollformer 12 to form the edge profiles for the metal sheet 26 and any holes or other features that are needed. This rollformer is made by Schlebach-Maschinen GmbH, Friedewald, Germany. Other rollformers may be used. This type of machine is often taken to the customer's house or building and the coil of steel is then unrolled and cut and bent into architectural sheets of different lengths and configuration. The machine can also be used in a factory environment. The roof, soffit, nail strip and other configurations and metal can be formed by the machine shown in FIG. 1.

The rollformer 10 is programmable by a controller 56 to cut the metal into sheets at the desired location and angle.

The following is a list of parts for the machine of this invention:

PARTS LIST

Figure 2:
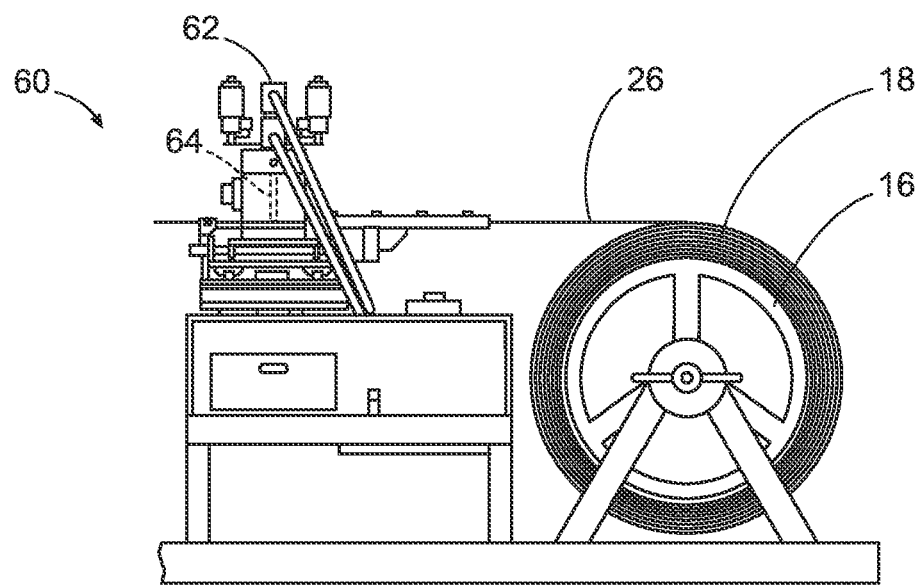
FIG. 2 is a schematic drawing of a notching device for punching holes in the metal coming off of the unwinding coil as shown in FIG. 1.

10. Programmable forming machine with decoiler, laminator and exit cutter
12. Rollformer
14. Decoiler and laminator
16. Decoiler reel for metal
18. Metal coil
20. Decoiler for solar panels held together by a backing
22. Coil of solar panels
24. Frame for Decoiler and laminator
26. Metal
28. Solar panels with backing
30. Spray system and wiper
32. Top pressure roller
34. Bottom pressure roller
36. Idler rollers
38. Side guides for aligning solar panels
40. Recoiler with motor
42. Brake for holding solar coil stationary.
44. Cross Adjust Handwheel
46. Backing for solar panels
47. Laminated metal and solar panels
48. Rollformer side guides for aligning metal and solar panels
50. Metal cutter
52. Rolling dies
53. Drive rollers
54. Machine exit
56. Programmable control controller
60. Notching device
62. Hydraulic cylinders
64. Metal punches
70. Forming rollers
80. Solar panel
82. Photovoltaic section of panel
84. Electrical contacts.
90. Cross section of panel
92. Solar panel
94. Metal panel
96. Female edge
98. Male edge
99. Exit cutter
100. Shear wheel
110. Touch screen
112. Emergency shut off button
120. Representative layout
122. User interface to select panel pattern
144. Pause button The programmable forming machine 10 in FIG. 1 may have a notching device 60 as shown in more detail in FIG. 2 for making notches in the steel after it is rolled off of the metal decoiler reel 16. The forming machine 10 may have an exit cutter 99 for cutting the metal at the desired location and angle as directed by the controller 56. All machines can be placed on a trailer for transporting to the installation site. After being notched the steel is transported into the rollformer 12 where it is configured and cut into sheets. This notching device 60 can be used to notch the steel in one or both of a parallel or angled pattern that will become the rollformed flanges of the panels, or could also be used to notch an access hole in the panel to allow access to bottom mounted electrical contacts that could be used in some building applications as directed by the controller 56.

Nearly any metal that has sufficient flexibility and thinness can be formed on the forming machine 10. Among these metals are copper, zinc, stainless steel, galvanized steel, prepainted steel, gavalume, and aluminum. These metals are placed on the decoiler reel 16 so that they can be unrolled freely.

The solar panels in a coil 22 can be placed on a similar decoiler 20 which can be unrolled freely. Any type of photovoltaic film panels of sufficient flexibility can be used with this invention. This solar film panels 80 may have an adhesive on the bottom to which a backing 46 is applied. This backing 46 is removed from the solar film panels by recoiler with a motor 40. The solar coil 22 can be adjusted laterally or perpendicular to decoiling (processing) direction with the cross adjust hand-wheel 44 to provide accurate alignment of the solar panels 28 to the metal 26, and to accommodate the various panel widths and seam configurations.

One type of film that can be combined with metal on the forming machine 10 is a thin film that has an amorphous silicon solar cell design. The amorphous silicon is desirable because it can be made into a very thin material. Many other types of thin film can be utilized. Other technologies such as CIGS, CdTE or other aSi technologies could be used provided they are packaged in such a manner to perform in the roofing environment. An adhesive can be placed on the back of the panel with a backing 46. It can be adhered to metal with the same type of machine 10 described herein.

Figure 3:
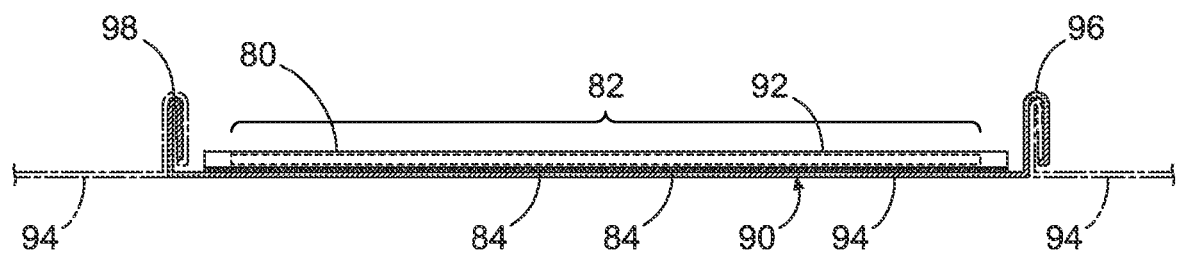
FIG. 3 is the cross-section taken along line 3-3 of FIG. 1 of one type of metal roofing panel with a solar panel attached.

An adhesive such as HelioBond PVA 600BT, which is a thermal butyl adhesive tape, can be used for adhering the photovoltaic film panels to a surface such as a roof. This photovoltaic film can be as thin as 4 mm. The solar panels as shown in FIG. 3 have a photovoltaic section 82 and may have low profile electrical contacts soldered in place, or flat wires attached so as to not disturb the laminating process. Low profile electrical junction boxes may be attached to the solar panel prior to installation on the structure. These boxes may use flat wire to fold and crimp the connection, or be of a simple male/female spade connector with a potted protective cover.

Any type of photovoltaic film panel which can be rolled into a coil and can be used to form the combination of a photovoltaic film panel and a metal panel.

Prior to entering the rollformer 12, the metal 26 is pulled off of metal coil 18 and the solar film panels 27 are pulled off of solar film coil 22 by drive rollers 53. The metal and the photovoltaic film panel travel from right to left as shown in FIG. 1. In this figure the coil of solar film 22 is located above the metal coil 18, but it should be realized that the coil of solar film 22 could be placed behind or in front of the metal coil 18 or any other convenient location, including after the rollforming process.

In respect to FIG. 1, the operator loads a solar panel coil 22 and closes the hinges on the tension brake 42 and the bearing assemblies (not shown). The operator manually positions the solar panel 28 relative to the pressure rollers 32, 34 using the cross adjust handwheel 44. The operator also sets side guides 38 located just prior to the pressure rollers 32, 34.

The operator then loads an empty core onto the cantilevered release liner take-up shaft or recoiler with a motor 40 and attaches the leader film to the core of the recoiler. The operator then threads the solar panel through the machine, under the machine encoder (not shown), and winds the leader film up to position the edge of the solar panel at the peel plate adjacent pressure rollers 32,34.

The pressure rollers 32, 34 are in the open position. The metal is threaded through the rollers and into the rollformer 12. When a solar panel is needed, the operator activates the pressure rollers and a pre-set amount of solar panel indexes into rollers 32, 34. This can be programmed into the controller 56. The bottom roller 34 then moves up, bringing the metal sheet 26 to the laminating position.

The drive rollers 53 of the rollformer 12 then pull the metal and solar panel through the pressure rollers 32, 34 for the length of the solar panel, e.g. 18 feet. When the length of solar panel has been fully applied, the brake 42 on the decoiler 20 actuates stopping the coil 22 and allowing the solar panel 80 to separate from the coil 22 at the glue gap between solar panels 80. While the solar panel 80 is being applied, the recoiler 40 shaft is winding up the solar panel backing 46. For positioning a solar panel 80 on the leading edge of the metal, a motor (not shown) is mounted adjacent the pressure rollers 32, 34 to reverse the metal 26 from the rollformer 12 after it has been sheared. This can also be programmed into the controller 56.

The rollformer 12 has a pair of guides 48 to make sure that the laminated metal and solar panels 47 are properly aligned in entering into the rollformer 12.

The unrolling of the coil of solar panels 22 and the placement of the solar panels 46 on the metal and other aspects of the process relating to solar panels can be controlled by the controller 56.

The rollformer 12 has a metal cutter 50 to cut the metal prior to the lamination of the metal and the photovoltaic film panels being processed. This metal cutter 50 may be independent of cutting or separating the solar panel backing 46. It may be necessary to cut the backing for the solar panels 46 independently of the metal 26. The solar panels may be of a length shorter than the length of the metal. Having a perforated backing 46, and brake 42 on the solar coil decoiler 20 and a metal cutter 50 will allow the independent cutting of the two components. The previously mentioned cutting wheels could cut the adhesive also if the perforation/brake method is not suitable. There typically would be a gap on the metal where there is no solar film panel so that the metal can be cut easily. It will be necessary for the metal cutter 50 to be programmed so that it does not cut the solar panel.

The metal cutter 50 can be a rotary shear which is two independent sets of rolling knives. It may have a lower wheel and an upper wheel that act as a pair of rotary scissors or rotary shears and cut the metal traversing from one side of the sheet to the other. The metal cutter 50 could also be a guillotine shear which would move straight down. The metal cutter 50 could also be a flat bottom blade with just one wheel cutting across it. A pair of rotary wheels may be preferred.

The combination of the metal and the solar film panel enter the rollformer 12 which consists of a series of rolling dies 52 that will form the metal flanges into the various configurations; it could be a snap lock, mechanical lock, or nail strip panel of varying heights. There are multiple pairs of rolling dies 52 on each side of the rollformer 12 arranged in cassettes for rapid profile changeover. These cassettes mount on each side of the frame of the rollformer 12. The rollformer 12 has drive rollers 53 to move the sheet through the rollformer 12. One of the cassettes forms a male side of the sheet with forming rollers 52 and the other forms the female side so the metal panels can be fitted together.

After rollforming the combination of the metal and the photovoltaic film panels, the combination will exit the rollformer 12 at exit 54. This will be a strip of metal with a solar panel firmly attached which can be used to form a roof for a building.

The forming machine with decoiler and laminator 10 preferably have a single programmable control 56 controlling both operations.

The exit cutter 99 cuts the metal into sheets as directed by the programmable controller 56.

FIG. 1 shows the photovoltaic film panels in a coil form. However, this film panel could be provided in sheet form using some type of stacking device so that sheets of photovoltaic film panels could be dropped on to the metal coming from a metal coil with any backing on the adhesive removed and then going through the pressure rolls 32, 34. Under these circumstances, it would not be necessary to cut the sheets of photovoltaic film.

FIG. 3 illustrates a cross section 90 of a photovoltaic film panel 92 on a metal panel 94. This panel has a female edge 96 and a male edge 98. This combination of photovoltaic film panel and metal panel has electrical contacts 84 to distribute the electricity generated by the solar cells.

It is possible to use the process and machine of this invention with in-plant rollformers but it is preferred to use on-site rollformers.

The exit cutter 99 is attached to a point so the programmable controller 56 can direct it to the proper angle and location for cutting. This notching device 60 can be used to notch the steel that will become the roll formed flanges of the panels, or could also be used to notch an access hole in the panel to allow access to the inside of the building or the support upon which the panels are mounted that could be used in some building applications. As these roof panels usually have a female edge on one side of the panel and a male edge on the other side of the panel, it is often necessary to punch a notch or hole in the female and male edges where it is determined to cut the panel at metal cutter 50 upon entering the rollformer 12 and at the exit cutter 99. Without such a notch or hole it may be difficult to cut the sheet.

The notching device 60 is capable of forming a notch or hole on each edge of the metal 26 as directed by the programmable controller 56. In some embodiments, a notch or hole can be formed on each edge of the metal where the exit cutter 99 will cut the metal 26 so that the exit cutter 99 can more easily cut the material exiting the rollformer 12. In some embodiments, the notching device 60 can also form an angled notch or hole on each edge of the metal 26 to facilitate cutting of an angled panel. The notching device 60 is preferably a punch that is hydraulically or pneumatically operated as directed by the programmable controller 56. The length of the notch can be approximately two inches but it can be expanded to four inches or more if desired by either tooling adjustments, changes, or additional length indexes as determined by the programmable controller 56. The programmable controller 56 can also determine and/or vary the size of notches based at least upon an angle of an edge of a panel. The ability to compensate for notch length as a function of angle degrees is also calculated to provide for optimum extended flat portions of the panel for closure and/or attachment to a structure.

The exit cutter 99 can be a rotary shear or other type of blade as can be appreciated for cutting metal 26 or similar materials. The exit cutter 99 can also be rotated about the metal exiting the rollformer 12 to cut roll formed metal into angled panels. As one example, angled panels can serve various building applications, such as in a roofing system. In some embodiments, an angle indicator can be incorporated into the exit cutter 99 to allow an operator to view an accurate angle of a cut before initiating the cut at the exit cutter 99. The exit cutter 99 can further include a clamping system that allows the metal 26 exiting the rollformer to be secured or clamped into place for cutting by the exit cutter 99.

The shear wheel 100 can be powered by an electric motor (not shown) to cut the metal. The programmable controller 56 can facilitate moving of the shear wheel 100 to the proper location for cutting the metal. It should be understood that other types of cutting instruments can be used for cutting the metal.

In other embodiments, the exit cutter 99 can be an automated cutting system that requires no operator intervention. The shear wheel 100 can be controlled by moving means, such as an electric motor (not shown) which is controlled by the programmable controller 56. The angle and location of the exit cutter 99 can also be controlled by the programmable controller 56.

In the depicted example, the notching device 60 has at least one hydraulic cylinder 62 that drives a metal punch. The punch can cut a hole in the metal 26 as directed by the controller 56. Various types and shapes of punches may be used to affect cuts or notches in the metal of various depths.

As shown in FIG. 1, the metal 26 is pulled from metal coil 18, through the notching device 60 and into the rollformer 12 by drive rollers 53. The various configurations can include, but are not limited to, a snap lock, mechanical lock, soffit/wall, and/or nail strip panel of varying heights that can be formed by the rolling dies 52. There are multiple rolling dies 52 on each side of the rollformer 12 arranged in removable cassettes. A cassette includes several rolling dies 52 that are disposed on each side of the rollformer. Accordingly, a removable cassette including several rolling dies 52 provides for rapid profile changeover, as various rolling dies 52 having different profiles that can be incorporated into the rollformer 12. The rolling dies 52 form the profile on each side of the sheet and help move the metal 26 through the rollformer 12. One of the cassettes forms a male side of the sheet with rolling dies 52 and another cassette on an opposing side of the sheet forms the female side of the sheet. Male and female sides of the metal panels are formed so that sheets produced by the forming machine can be fitted together.

Rolling dies 52 can be provided on both sides of the rollformer 12 to produce a concave sheet of metal in the linear direction if needed.

The forming machine 10 also includes a programmable controller 56 that directs the process of moving metal 26 through the notching device 60, the rollformer 12, and the exit cutter 99. The programmable controller 56 allows the process to be programmatically controlled. In other words, a complete structure comprising at least one, and often many, panels that are notched, formed, and cut by the rollformer 10 to be mapped out and/or designed by employing software that facilitates the creation of the layout of such a structure. The programmable controller 56 allows structures having various planes, angles, facets, and other complexities to be imported into the programmable controller 56. Then, the various panels forming a complete structure can be made by an operator with the assistance of the controller 56. In one example, roofing structures comprising panels having various sizes, and other characteristics can be created.

Accordingly, the measurements, dimensions, and other aspects of each panel of the structure can be determined by design software that can be imported into the programmable controller 56, which can instruct the notching device 60 how to notch each panel produced by the forming machine 10. In other embodiments, the measurements, dimensions, and other aspects of a structure on which a roof is to be constructed can be determined by measurement devices or systems that are on site. As one non-limiting example, a laser phase shift scanner can scan a structure on which a roof is to be constructed in order to determine precise measurements of the various facets or planes that comprise a roofing system, thereby facilitating cutting of metal panels that comprise such a roofing system. As additional non-limiting examples, point-to-point measuring assist devices, laser scanners, photogrammetry devices, stereo-photography systems, or other three dimensional measurement systems can be employed in similar fashion. Precision measurement data such as this can be imported into the programmable controller 56 in order to facilitate precise cutting of metal planes forming a roofing system.

Accordingly, the controller 56 can instruct the rollformer 12, particularly the rolling dies 52 how to facilitate roll forming a panel. In one embodiment, the controller 56 can specify a rate at which the rolling dies 52 or other means move metal 26 through the forming machine 10. Finally, the controller 56 can instruct an operator when to activate the exit cutter 99 in order to cut metal 26 moving through the forming machine 10 in order to create a panel. The controller 56 can also instruct an operator as to the angle at which the exit cutter 99 should be activated in order to create an angled panel. In some embodiments, the programmable controller 56 can activate an automated exit cutter 99 to create panels from the forming machine 10.

The programmable controller 56 can also be provided in a networked environment so that the programmable controller 56 can be modified, maintained, or in communication with another computing device accessible via a network. In this way, a user of an embodiment of the disclosure may download a structure for which the forming machine 10 can be configured from a remote location. In other embodiments, remote support for a user of the programmable controller 56 can be provided via a network to which the controller 56 is attached.

In some embodiments, the programmable controller 56 can import electronic representations of a building and determine the appropriate panels that should be formed in order to construct a roofing system. As a non-limiting example, building information modeling files, which can define the spatial relationship between various components of a building structure, can be imported into the programmable controller 56, which can then determine the appropriate panels comprising a roofing system that should be cut.

A measuring device for measuring the roof can be incorporated with a roll forming machine to form a system for measuring and cutting panels to form a roof. This measuring system may be based upon laser or infrared technology. This measuring system can be located on the roof of the building or located on the ground near the building. The measuring system may be connected by wire to the controller 56 for the roll forming machine.

One example of a satisfactory measuring system is the Leica Flexline which comes complete with software and can be connected by wire to the roll forming machine 10 or through Bluetooth® wireless technology. The Leica Flexline system allows the measurement of roofs that have various angles in them. The data from the Leica Flexline system can be transferred to the controller of the forming machine by cable, by USB memory stick or in a wireless manner.

Another system is the TDS Nomad that is used with a laser system for measuring with the Nomad handheld computer collecting, saving and transmitting the data in the field. It can be done wirelessly or the Nomad computer can be connected by a cable to the controller on the forming machine.

These measuring systems can be used for measuring a roof where the panels are all in one plane or where there are a number of valleys and turns in the roofing system.

The incorporation of a measuring device and method with the forming machine completes a system for measuring the roof and cutting the panels for installation according to the roof measurements. It constitutes a complete system.

A number of other systems such as photo-grametry or stereophotography could be used to be part of the system for measuring and cutting roofing panels.

This system for measuring and cutting roofing panels can lead to the development of a Computer Integrated Roof Manufacturing (CIRM). The forming machine is basically referred to as a computer integrated notching cutting operation (CINCO).

The controller 56 on the forming machine 10 can be part of the machine or a detached PC can be used for wireless communication with the controller.

In yet other embodiments, the programmable controller 56 can wirelessly communicate with the remainder of the forming machine 10 so that an operator can manipulate the controller 56 and allow the remainder of the forming machine 10 to be located elsewhere. As one non-limiting example, in some roofing system projects, a forming machine can be lifted via crane directly onto or near the roof structure of a building. Accordingly, an operator can direct operation of the forming machine 10 via a wirelessly connected programmable controller 56.

Figure 4:
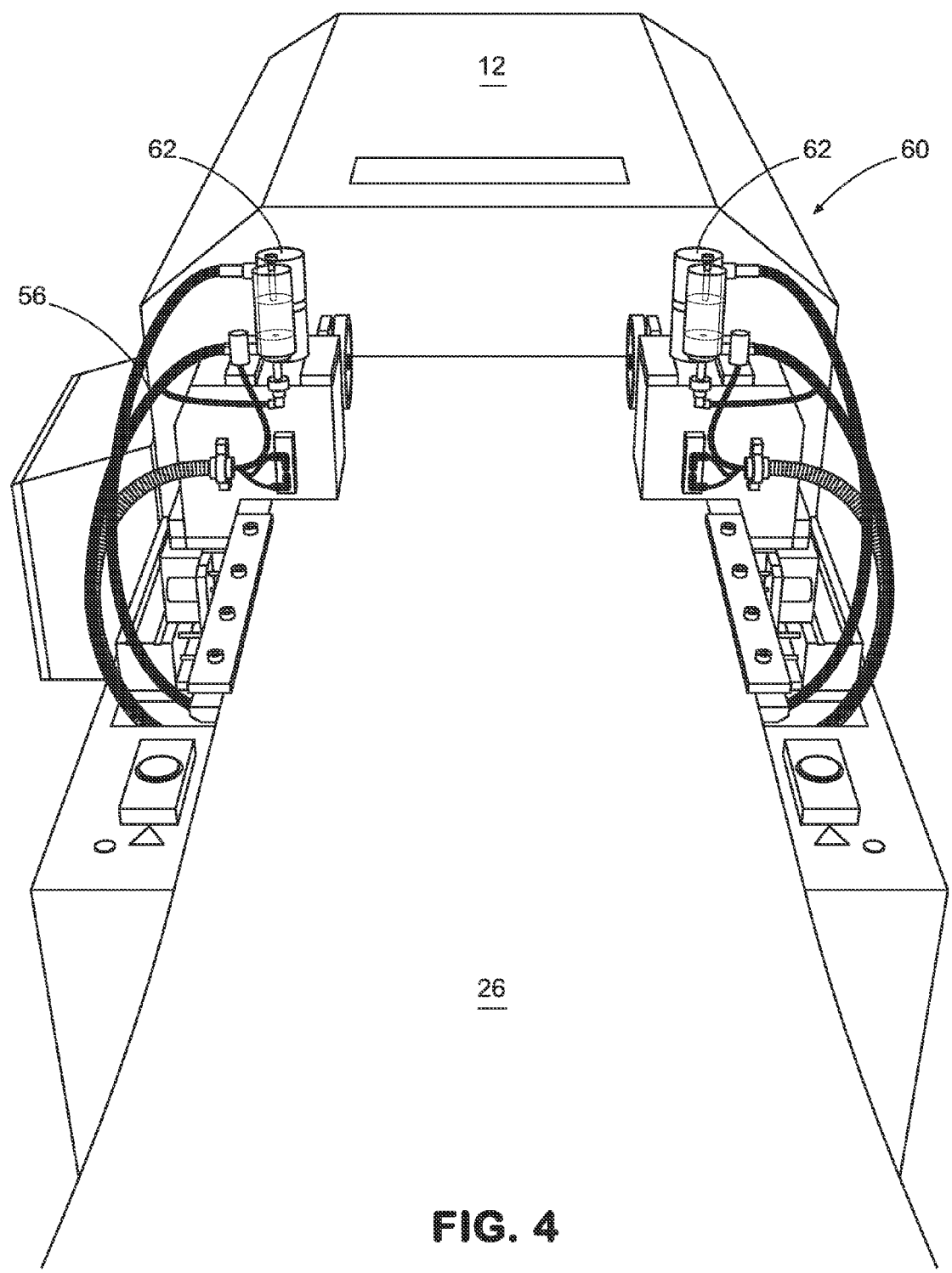
FIG. 4 is a perspective view of the notcher of the forming machine shown in FIG. 1.

FIG. 4 is a perspective view of the front end of the forming machine 10.

Specifically, FIG. 4 depicts metal 26 entering the notching device 60 of the rollformer 12. As noted above, the notching device 60 includes hydraulic cylinders 62 positioned on either edge of the metal 26 so that notches can be formed to facilitate cutting of a metal 26 by the exit cutter 14. The notching device 60 can also be controlled by the programmable controller 56 in order to programmatically direct the production of various metal panels of a complete structure, or for precision production of a single panel.

Figure 5:
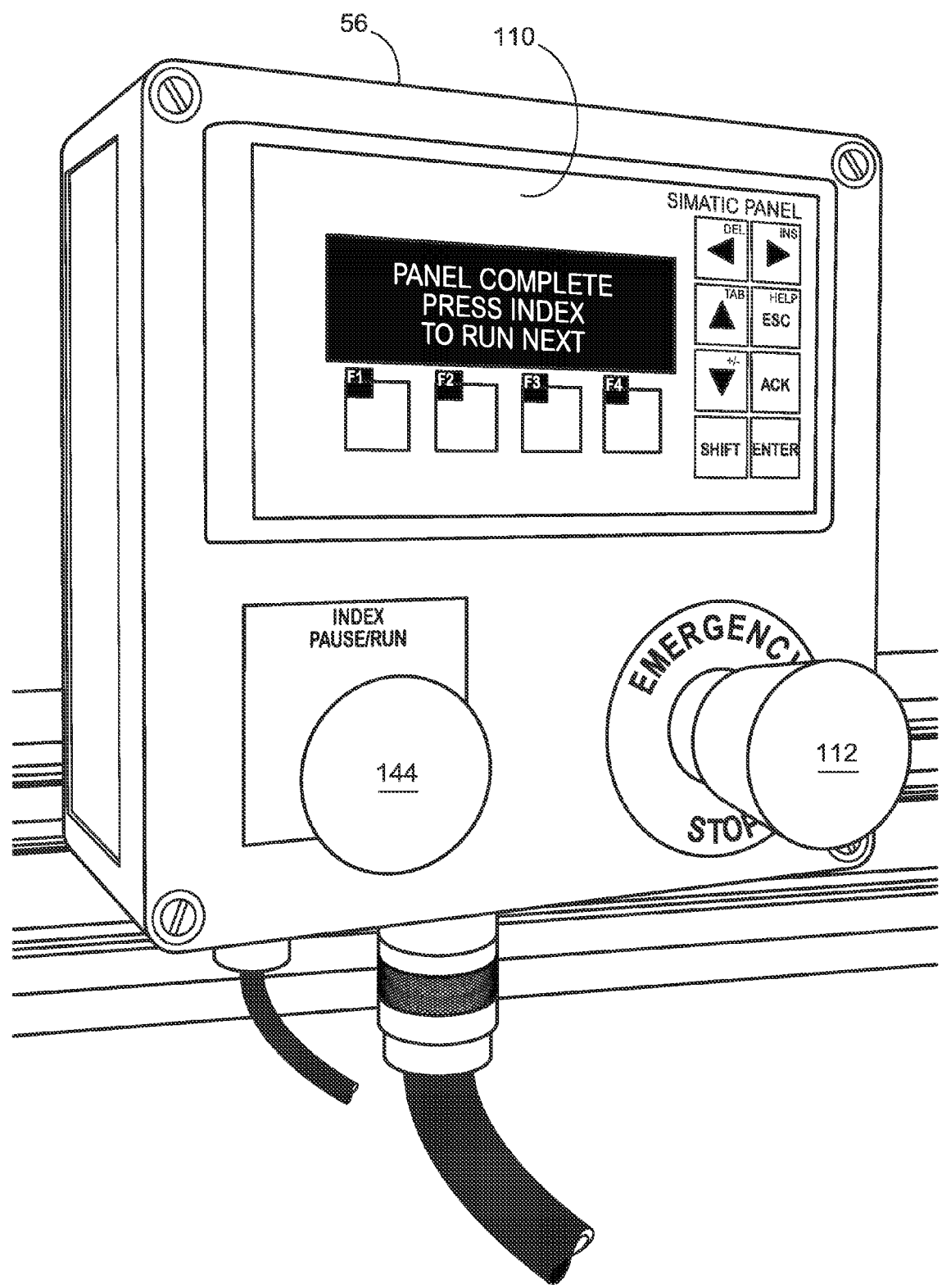
FIG. 5 is a drawing of a programmable controller for directing the rollformer to move material through the rollformer and for directing the cutter to cut the material at a desired length and angle.

FIG. 5 depicts one example of a programmable controller 56 of the forming machine 10. The programmable controller can be mounted on the forming machine or in communication with the forming machine 10 in order to direct the process of producing panels. In one embodiment, the forming machine 10 can include a computer system. The computer system may include one or more processor circuits having a processor and a memory, both of which are coupled to a local interface. In this respect, the local interface may comprise, for example, a data bus with an accompanying control/address bus as can be appreciated.

In some cases it may be desirable to control the machine with a wireless programmable computer. This is especially useful when the forming machine is lifted to the roof of the building for cutting metal.

Metal 26 is cut near the entry to the rollformer 12 preferably by a rotary shear wheel or other means as directed by the programmable controller 56.

Stored on the memory and executable by the processor are various components such as an operating system and software that facilitates directing the activities of the forming machine's 10 various components. In addition, it is understood that many other systems or components may be stored in the memory and executable by the processors. Also, such components may reside in a memory that is external from the computer system as can be appreciated.

As set forth above, the operating system and other software are stored in the memory and are executable by the processor. In this respect, the term "executable" refers to a program file that is in a form that can ultimately be run by the processor. Examples of executable programs may be, for example, a compiled program that can be translated into machine code in a format that can be loaded into a random access portion of the memory and run by the processor, or source code that may be expressed in proper format such as object code that is capable of being loaded into a random access portion of the memory and executed by the processor. An executable program may be stored in any portion or component of the memory including, for example, random access memory, read-only memory, a hard drive, compact disk (CD), floppy disk, or other memory components or input/output (IO) devices.

The memory is defined herein as both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor may represent multiple processors and the memory may represent multiple memories that operate in parallel. In such a case, the local interface may be an appropriate network that facilitates communication between any two of the multiple processors, between any processor and any one of the memories, or between any two of the memories. The processor may be of electrical, optical, or of some other construction as can be appreciated by those with ordinary skill in the art.

The operating system is executed to control the allocation and usage of hardware resources such as the memory and processing time in the computer system. In this manner, the operating system serves as the foundation on which applications depend as is generally known by those with ordinary skill in the art.

As noted above, data regarding a layout or other representation of a structure can be loaded into the programmable controller 56 so that the controller 56 can direct the notching device 60, rollformer 12 and exit cutter 99 so that the controller 56 can direct the production of metal panels comprising the complete structure. Data can be loaded into the controller 56 via an input/output device, such as, a USB storage device, or other devices that should be appreciated. In other embodiments, the controller 56 can be accessible via a local area or wide area network, and data can be loaded into the controller 56 via the network access. Data from the roof design can be loaded into the controller 56. Measurements can be taken on the job and any variations of the design corrected in the controller 56. This is necessary as roofs are not always built to the design specifications and drawings.

In the depicted embodiment, the controller 56 includes a touch screen 110 with which an operator can interact in order to control the notching device 60, rollformer 12 and exit cutter

99. The controller 56 can also include an emergency shutoff button 112 for shutting down the forming machine 10 in the case of an emergency. The controller can also include a pause button 144 for pausing and/or activating the forming machine 10.

Figure 6:
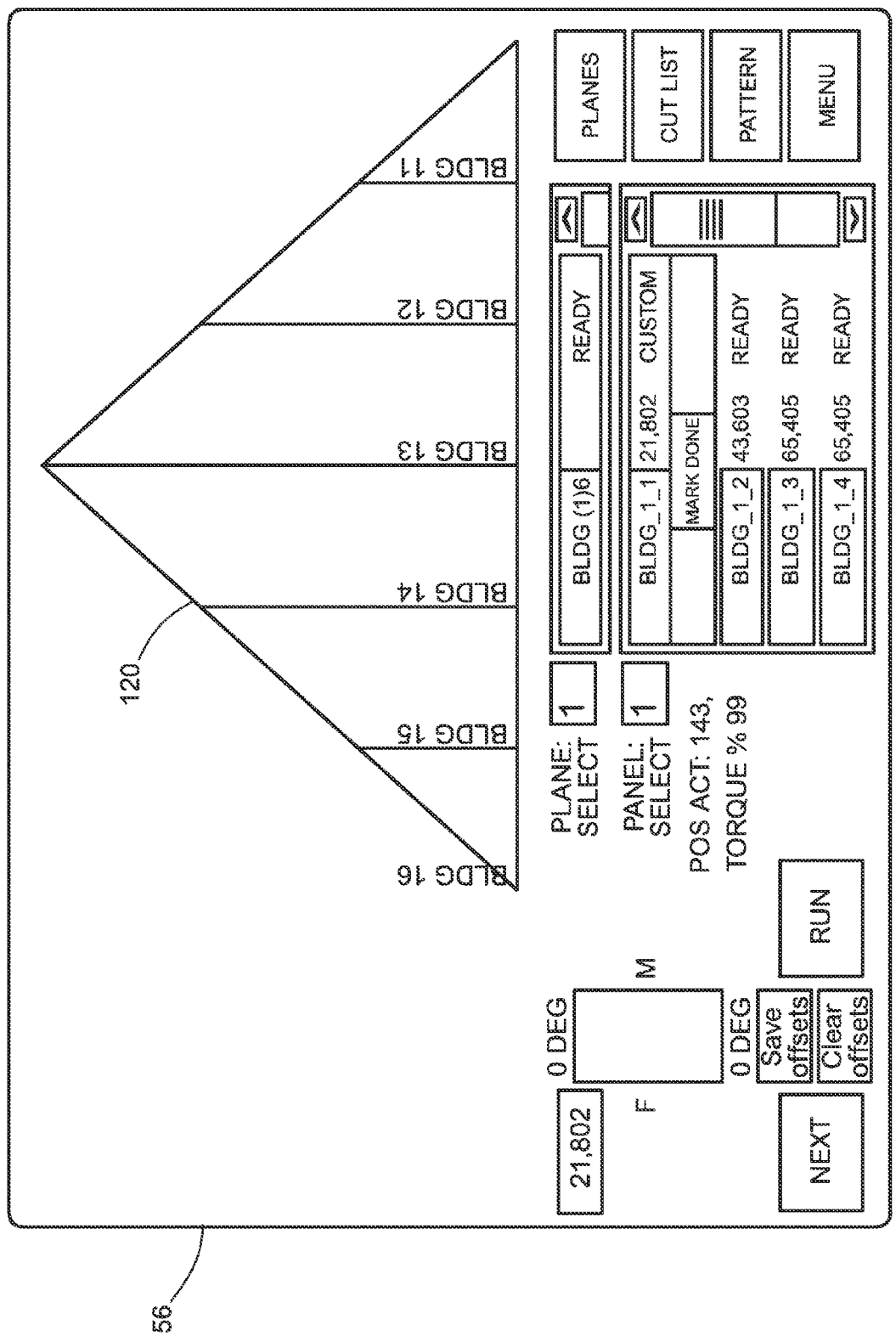
FIG. 6 is a user interface generated by the programmable controller.

FIG. 6 depicts a user interface generated by the controller 56 with which an operator can interact. The depicted example is shown for illustrative purposes, and is not intended to represent an exhaustive view of the functionality that a programmable controller 56 according to an embodiment of the disclosure can implement. In the depicted user interface of FIG. 6, the programmable controller depicts a representative layout 120 of a structure that can be produced by the forming machine 10. In this non-limiting example, the layout loaded into the controller is a triangular structure comprising a plurality of panels that can be joined by male and female edges. Accordingly, given this particular structure, the programmable controller 56 can determine how metal 26 moving through the forming machine 10 should be notched by the notching device 60, cut by the metal cutter 50, formed by the rollformer 12, and cut by the shear wheel 100 of the exit cutter 99 to enable an operator to quickly produce metal panels so that the depicted layout 120 can be constructed.

Figure 7:
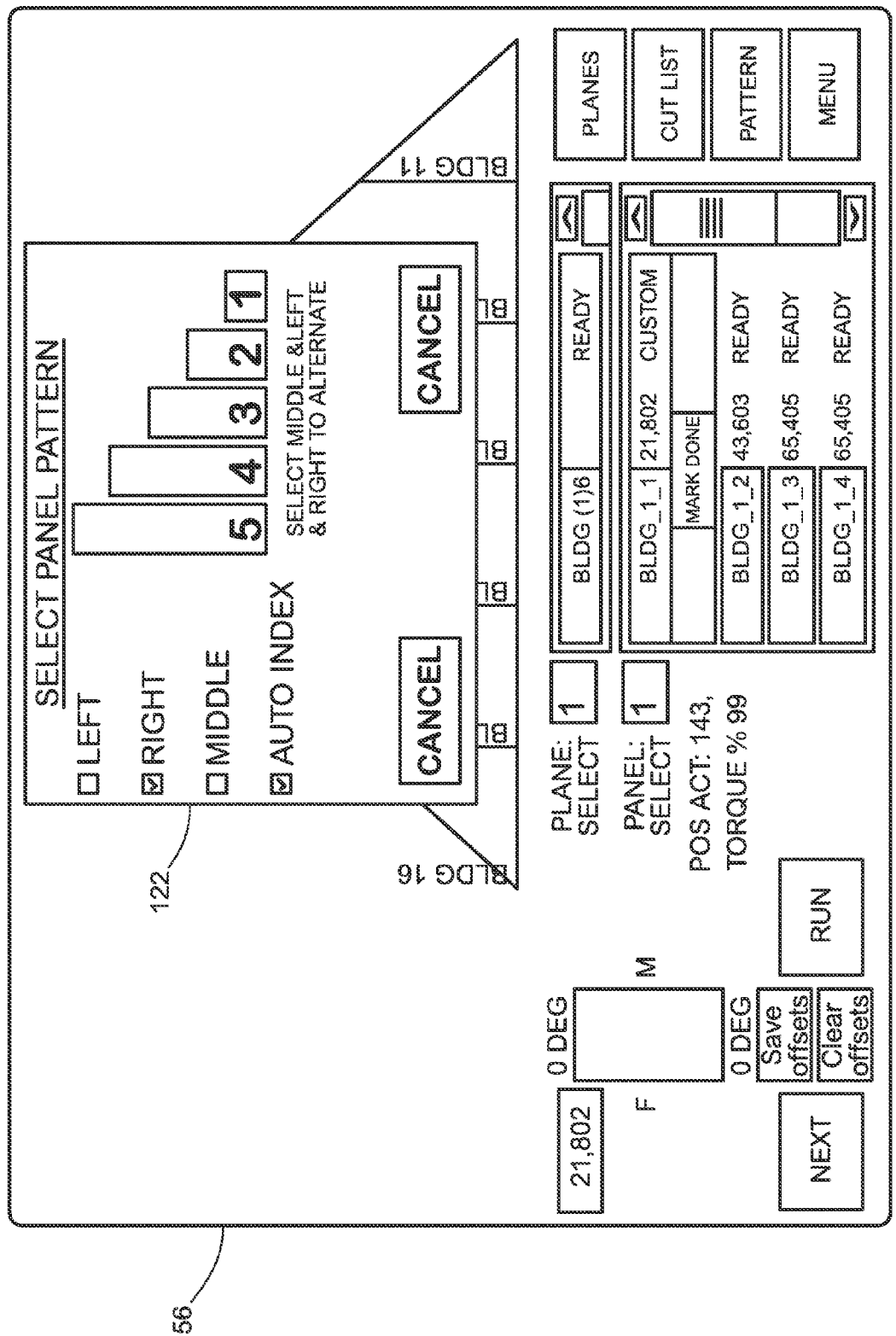
FIG. 7 is an alternative user interface generated by the programmable controller.

FIG. 7 depicts an alternative user interface 122 generated by the controller 56, which allows an operator to determine the order in which panels comprising the structure represented by the layout 122 are created by the forming machine 10. For example, the panels comprising the structure can be created in a left-to-right, right-to-left, or center-out fashion. In addition, the panels comprising the structure can be created in any order desired by the operator. In some embodiments, the forming machine 10 can etch or otherwise impart a numbering or ordering scheme on the panels so to facilitate assembly of a plane of a structure in the proper order.

Figure 8:
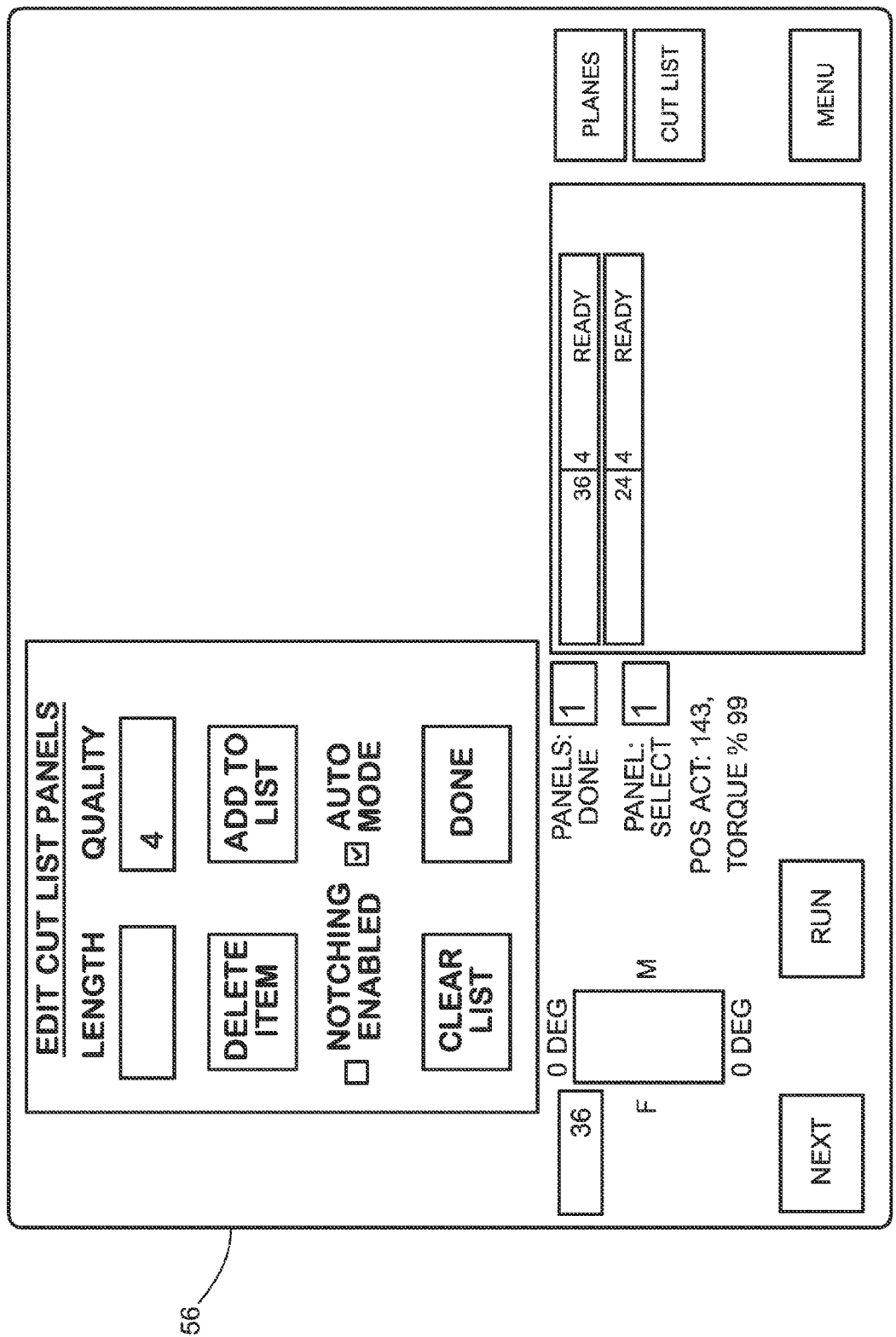
FIG. 8 is an alternative user interface generated by the programmable controller.

FIG. 8 depicts yet another user interface which allows an operator to select various other parameters regarding the panels created by the forming machine 10. In the depicted example, the operator can select whether notching of the panels by the notching device 60 is enabled, or the operator can allow the forming machine 10 to determine whether notching is advisable. In some embodiments, the operator may enter dimensions, a number of panels, and how and where to notch a panel (if at all) in order to generate panels without an imported layout. In other words, an operator can manipulate a user interface provided by the controller 56 and enter information in order to manually generate one or more panels.

Figure 9:
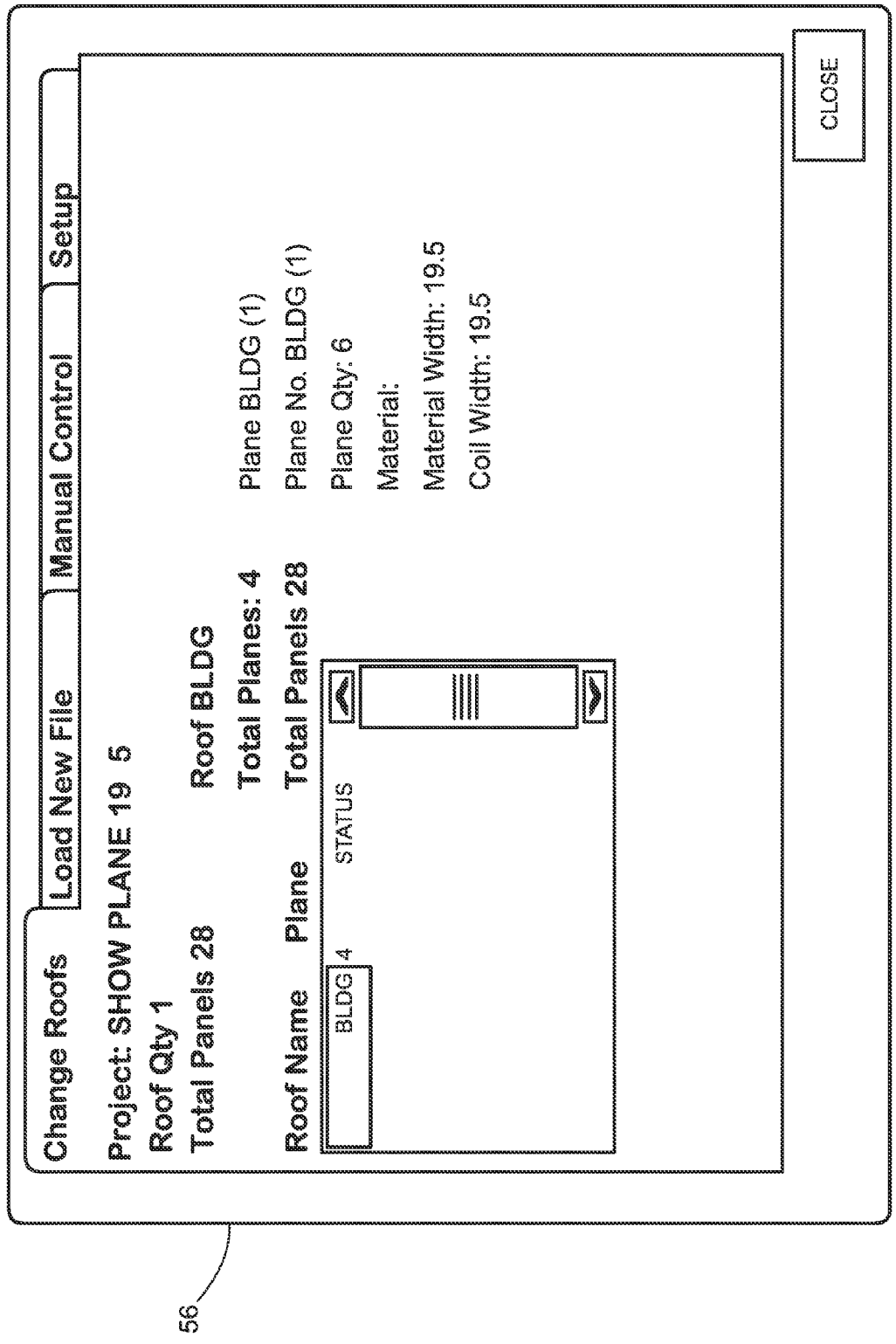
FIG. 9 is an alternative user interface generated by the programmable controller.

FIG. 9 depicts an alternative user interface illustrating other potential functionality implemented by the programmable controller 56. In the depicted example, the programmable controller 56 can allow an operator to store and/or access various layouts for various structures. For example, the forming machine 10 can facilitate manufacture of a roofing system having various planes made up of various panels. Such a complex structure can include hundreds or even thousands of panels. Accordingly, the controller 56 can store a layout of the structure and determine the length, angle, and other dimensions of each metal panel comprising the structure and direct the forming machine 10 accordingly.

The user interfaces generated by the controller 56 also allow an operator to advance the controller 56 to the next panel after a panel is generated and cut by the exit cutter 99. In other words, when the forming machine 10, as directed by the controller 56, generates a panel (that is cut by an operator at the exit cutter 14), the machine can pause and allow the operator to advance the program to the next panel that is needed for a given layout. In one embodiment, the operator can advance the program by interacting with the touch screen 110, pause button 144, or other input devices and/or buttons positioned elsewhere on the forming machine (e.g. adjacent to or within reach of the exit cutter, etc.).

Figure 10:
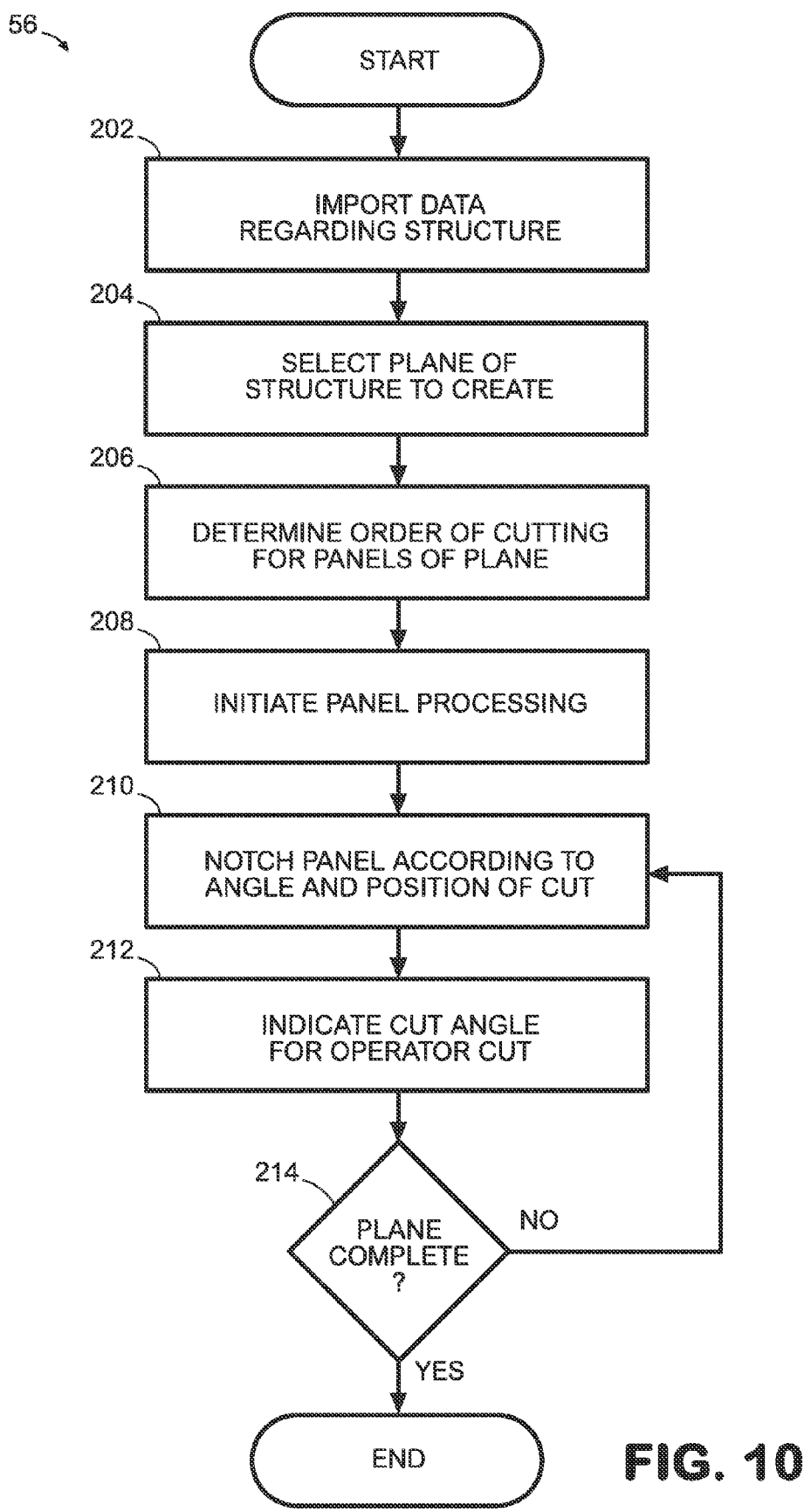
FIG. 10 is a flow chart showing the steps taken by the controller in notching and cutting a panel.

FIG. 10 depicts a flow diagram of one example of execution of the programmable controller 56 creating one or more panels comprising a structure. Alternatively, the flow chart of FIG. 10 can be implemented as a method or process. First, in box 200, dimensional roof data is drawn in the chosen roofing program. Box 201 would allow the program user to designate what panels, if any, are to receive solar panels. Next, in box 202, data regarding the layout of a structure are imported into the programmable controller 56. As noted above, a layout of a structure (e.g., a roofing system) can be imported into the controller 56 via a network access, IO device (e.g., a USB memory device), etc. As also noted above, a structure can include various planes, peaks, valleys, pitches, etc. of varying complexity. Accordingly, the controller 56 determines a series of panels that are required for each plane of each surface of the imported structure. In one embodiment, the controller 56 can process a layout of a completed structure and reduce the structure into a series of planes.

An alternate to designating which metal panels are to have a solar panel laminated to them, the operator could, in box 203 select or de-select panels as receiving solar laminates. Then, in box 204 an operator can decide (or rely on the controller 56 to decide for him) a plane of the structure he desires to create. In one embodiment, the controller 56 can display via the layout of the structure and identify the plane of the structure that is being produced. In box 206, upon identification of a plane for production, the order of panel cuts can be determined. Again, an operator can choose an order or rely on the controller 56 to choose an order of cutting. As noted above, panels comprising a plane can be cut left-to-right, right-to-left, center-out in either direction, or any order that can be appreciated.

Then, in box 208, an operator can initiate panel processing, or the process of moving metal through the notching device 60, the rollformer 12, and the exit cutter 99 in order to create panels of a structure or plane. Accordingly, the controller can activate a means of moving material through the forming machine 10, whether it is a feed wheel or the rolling dies 52 of the rollformer 12, the decoiler reel 16, or other device for moving material through the machine. The controller 56 can specify a rate depending on the material employed or the desires of the operator in order to move material through the notching device 60. In box 210, the operator or controller can direct the notching device 60 to make notches on either edge of the material, which is then moved through the rollformer 12. The rollformer 12 can form a male edge and a female edge on either edge of the material.

The controller 56 can then, in box 212, indicate an angle for an operator to cut the material arriving at the exit cutter 99. To facilitate cutting, the controller 56 can pause the moving of material through the forming machine 10, providing an opportunity for an operator to clamp the exiting material and select the proper indicated cutting angle on the exit cutter 99. Upon making a cut with the exit cutter 99, the operator can cause the controller 56 to resume the process via a resume button or other input device as can be appreciated. In box 214, the controller can determine whether the plane is complete, or whether each panel of a plane has been created. If not, the controller 56 can continue moving material through the forming machine and return to box 210. If so, the controller 56 can terminate. In some embodiments, the controller can simply queue the next plane for construction or allow the operator to choose the next plane of the structure.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems is expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system. In the context of the present disclosure, a "computer-readable medium" can be any medium that can contain, store, or maintain the network page for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the functionality of various embodiments are described above with respect to FIGS. 1-10 as being embodied in software or code executed by general purpose hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

The invention claimed is:

1. A programmable forming machine for combining a thin flexible solar film panel with a metal sheet comprising:
   a de-coiler for holding a coil of metal;
   a reel for holding a coil of a plurality of solar film panels, each of which has a top for exposure to the sun and a bottom, with the bottoms of each panel having an adhesive with a backing extending over the bottoms of the panels for protecting the adhesive;
   means for unrolling the metal and solar film panels from their respective coils and for moving the metal through the forming machine;
   means for removing the backing from the solar film panels;
   means for pressing the solar film panels to the metal so that the adhesive on the bottom of the solar film panel adheres to the metal;
   an exit cutter for cutting the metal into sheets and configuring the metal into the desired structure; and
   a programmable controller for directing the means for moving the metal through the forming machine and directing the exit cutter to cut the metal at the desired length and angle.

2. The machine of claim 1 in which the means for pressing the solar film panels to the metal is a least one pair of pressure rollers between which the solar film panels and metal are run.

3. The machine of claim 1 in which the reel for the solar panel coil has means for stopping the coil from being unwound at the proper location to allow the cutting of the metal between solar film panels without damaging the solar panels.

4. The machine of claim 1 in which there are means to reverse the metal out of the rollformer after the metal has been cut in order to align the solar film panel with the metal sheet before running the combination of the metal and solar film panel through the rollformer for configuring the metal into the desired structure.

5. The machine of claim 4 in which the means to reverse the metal out of the rollformer after the metal has been cut is a motor powering the pressure rollers to turn in reverse away from the rollformer with the machine having an indexing system to properly align the solar film panel with the metal.

6. The machine of claim 1 in which the solar film panels are applied to the metal panels after being processed by the forming machine.

7. The programmable forming machine of claim 1 further comprising a notching apparatus selectively enabled to punch notches or holes in edges of the metal as directed by the programmable controller prior to the metal entering the rollformer at the locations selected for cutting the sheet by the metal cutter and the exit cutter as directed by the programmable controller.

8. The programmable forming machine of claim 7 in which the controller is programmed to direct the notching apparatus to form the notches or holes in the metal, the rollers located on each side of the rollformer to pull the metal and the exit cutter to cut the metal at the desired length and angle, with the programmable controller being programmed to perform these operations on the metal in accordance with the actual dimensions and design of the roof as entered into the controller so that the metal can be cut into sheets, so that each sheet has the correct notches or holes, profile, length and angle for its position on this roof.

9. The programmable forming machine of claim 1 in which the means for moving the metal I through the rollformer is at least two rollers located on each side of the rollformer for pulling the metal off of the decoiler.

10. The programmable forming machine of claim 1 in which the exit cutter comprises a rotary shear attached to a turntable selectively enabled to turn to the desired angle for cutting the metal through a notch or hole in each edge of the metal as directed by the programmable controller.

11. The programmable forming machine of claim 10 in which the rotary shear is powered by a power means to cut the metal with power means directed by the programmable controller to cut at the right place and angle.

12. The programmable forming machine of claim 1, wherein the programmable controller displays the desired angle for cutting the metal on a display device and pausing means for stopping the metal to allow the exit cutter to cut the metal at the desired location and angle.

13. The programmable forming machine of claim 1 with the machine further comprising a notching apparatus selectively enabled to punch notches or holes in edges of the metal as directed by the programmable controller prior to the metal entering the rollformer at the locations selected for cutting the metal by the metal cutter and exit cutter as directed by the programmable controller, in which the means for moving the metal through the rollformer is at least two rollers located on each side of the rollformer for pulling the metal off of the decoiler and through the notching apparatus and into and through the rollformer as directed by the programmable controller, and in which the exit cutter comprises a rotary shear attached to a turntable selectively enabled to turn to the desired angle for cutting the metal as directed by the programmable controller.

14. A programmable forming machine for combining a thin flexible solar film panel with a metal sheet comprising:
   a reel for holding a coil of metal;
   a reel for holding a coil of a plurality of solar film panels, each with a top and bottom, with the bottoms of the panels having an adhesive with a backing for protecting the adhesive;
   with the backing being removed from the solar film panels by a recoiling reel on which the backing is recoiled;
   with at least a pair of pressure rollers for pressing the solar film panels to the metal so that the adhesive on the solar film panel adheres to the metal;
   a rollformer for cutting the metal of the combined metal and solar film panels into sheets and configuring the metal into the desired structure;
   with the rollformer pulling the metal and solar film panels from their respective coils, and the reel for the solar film panel coil has a mechanical brake which is controlled for stopping the reel at the proper location for the cutting of the metal between solar film panels; and
   a programmable controller for directing the means for moving the metal through the forming machine and directing the cutter to cut the metal at the desired length and angle.

15. The machine of claim 14 in which there are means to reverse the metal out of the rollformer after the metal has been cut in order to align the solar film panel with the metal sheet before running the combination of the metal and solar film panel through the rollformer for configuring the metal into the desired structure.

16. A programmable forming machine for combining a thin flexible solar film panel with a metal sheet comprising:
   a reel for holding a coil of metal;
   means for holding at least one solar film panel having an adhesive with a backing for protecting the adhesive;
      means for unrolling the metal from its coil;
      means for placing a solar film panel on the metal,
      means for removing the backing from the solar film panel;
      means for pressing the solar film panels to the metal so that the adhesive on the solar film panels adheres to the metal;
      a rollformer for cutting the metal between solar film panels into sheets and configuring the metal into the desired structure;
      a programmable controller for directing the means for moving the metal through the forming machine and directing the cutter to cut the metal at the desired location and angle.

17. A system for measuring a roof and cutting an elongated sheet of metal with two edges into panels of a selected profile, length and angled or straight end thereon to accurately cover the roof with the panels which are combined with thin flexible solar films, comprising:
   a. a measuring device for measuring the dimensions of the roof and collecting the data on the measurements;
   b. a de-coiler for holding a coil of metal;
   c. a reel for holding a coil of a plurality of solar film panels, each of which has a top for exposure to the sun and a bottom, with the bottom of each panel having an adhesive with a backing extending over the bottom of the panel for protecting the adhesive;
   d. means for unrolling the metal and solar film panels from their respective coils;
   e. means for removing the backing from the solar film panels;
   f. means for pressing the solar film panels to the metal so that the adhesive on the bottom of the solar film panel adheres to the metal;
   g. a rollformer for automatically moving and cutting the metal of the combined metal and solar film panels into sheets and configuring the metal into the desired structure; and
   h. a programmable computer for directing the means for moving the metal through the rollformer and directing the cutter to cut the metal at the desired length and angle;
   i. with the measuring device transferring the data to the programmable controller which automatically processes the data to cut the panels of desired length and angle for covering the roof with panels.

18. The system of claim 17 in which the measuring device measures the roof with a laser identifying the critical points on the roof for cutting the panels.

19. The system of claim 17 in which the rollformer further comprises an exit cutter proximate to the exit of the rollformer to receive the profiled sheet of metal and selectively enabled to cut the sheet at the desired length and angle and a notching apparatus selectively enabled to punch notches or holes in edges of the metal at the locations selected for cutting the sheet as directed by the programmable controller prior to the metal entering the rollformer.

* * * * *